United States Patent Office 3,527,773
Patented Sept. 8, 1970

3,527,773
BENZYLOXY COMPOUNDS AND EPOXY
DERIVATIVES THEREOF
Raymond L. Cobb, Bartlesville, Okla., assignor to Phillips
Petroleum Company, a corporation of Delaware
No Drawing. Continuation-in-part of application Ser. No.
531,351, Mar. 6, 1966. This application Oct. 17, 1968,
Ser. No. 768,520
Int. Cl. C07d 1/00
U.S. Cl. 260—348                            3 Claims

ABSTRACT OF THE DISCLOSURE

Organic compounds are formed by treating a mixture of allylic halides with an alkali metal salt of benzyl alcohol. The reaction products are oxidized to form novel epoxide compounds. The novel benzyloxy compounds are useful as monomers for polymerization reactions and the epoxy derivatives thereof are useful in preparing curing agents, adhesives, and plasticizers.

---

This application is a continuation-in-part of Ser. No. 531,351, filed Mar. 6, 1966, now abandoned.

This invention relates to the production of novel organic compounds. In one aspect, this invention relates to novel organic derivatives of allylic halides. In another aspect, this invention relates to novel epoxide derivatives of said allylic halides.

I have discovered that if a mixture of allylic halides is formed by halogenating olefins in the presence of excess halogen and this mixture is subsequently treated with an alkali metal salt of benzyl alcohol that novel compounds are produced which can be readily separated by fractionation, crystallization, and the like. I have further discovered that it is possible to treat these novel reaction products with peroxidizing agents in order to form novel epoxide derivatives thereof. This mixture, of halogenated allylic halides, can be characterized as containing compounds having the following formulas:

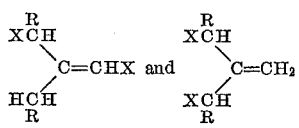

where each R is selected from the group consisting of hydrogen and an alkyl radical having 1 to 4 carbon atoms and each X is selected from the group consisting of chlorine, bromine, and iodine.

Some specific examples of such halogenated allylic halides are 1,3 - dichloro - 2 - methylpropene; 3-chloro-2-(chloromethyl)propene; 1-bromo - 2 - (bromomethyl)butene; 3-bromo-2-(bromomethyl)butene-1; 1-iodo - 2 - (1-iodopentyl)heptene - 1; 1,1-bis(1-iodopentyl)ethylene; 1-chloro - 2 - (chloromethyl)hexene - 1; 3-chloro-2-(chloromethyl)hexene-1; 1-bromo-2-(1-bromopropyl)pentene-1; 1,1 - bis(1 - bromopropyl)ethylene; 1-chloro-3-bromo-2-methylpropene; 3 - bromo-2-(chloromethyl)propene; and the like and mixtures thereof.

This reaction can be illustrated schematically as follows:

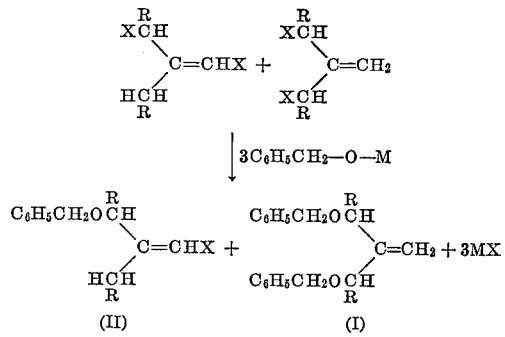

M is an alkali metal. The initial halogenation of an olefin can be carried out in the presence of carbon tetrachloride. The step of reacting the halogenated mixture with an alkali metal salt of benzyl alcohol is carried out in the presence of a solvent which is nonreactive under the conditions of the reaction. Such solvents are benzene, toluene, ethylbenzene, tetrahydrofuran, cyclohexane, paraffin hydrocarbons boiling at a temperature of 70–150° C.; ethers such as bismethoxyethyl ether, dioxane and mixtures of 2 or more of such compounds. It is also within the scope of this invention to carry out this reaction in the absence of an extraneous solvent if excess benzyl alcohol is employed.

Some specific examples of such benzyloxy products are: 1-chloro-2-methyl-3-benzyloxypropene; 1,1-bis(benzyloxymethyl)ethylene; 1-bromo - 2 - (benzyloxymethyl)butene; 3-benzyloxy-2-(benzyloxymethyl)butene-1; 1-iodo - 2 - (1-benzyloxypentyl)heptene-1; 1,1 - bis(1 - benzyloxypentyl)ethylene; 1-chloro-2-(benzyloxymethyl)hexene-1; 3-benzyloxy-2-(benzyloxymethyl)hexene-1; 1-bromo-2-(1-benzyloxypropyl)pentene-1; 1,1-bis(1-benzyloxypropyl)ethylene; 1-chloro-3-benzyloxy-2-methylpropene, and the like and mixture thereof.

The products I and II can be treated with a suitable oxidizing agent for conversion to novel epoxides having the following structures:

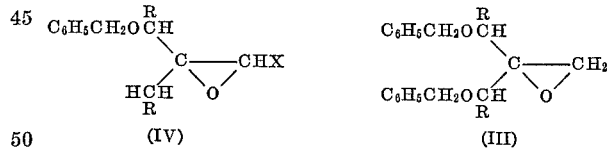

wherein R and X are as defined hereinabove.

Oxidizing agents which are useful in oxidizing the novel allylic halides to the corresponding epoxides are selected from the group consisting of perbenzoic acid and substituted perbenzoic acids such as m-chloroperbenzoic acid, persulfates such as sodium persulfates, peroxides such as hydrogen peroxide, peracetic acid and other such peroxidic oxidizing agents.

The epoxidation reaction can be carried out in the presence of a solvent selected from the group enumerated hereinabove in regard to the step of reacting the novel allylic halogenated compounds with a metal salt of benzyl alcohol.

Some specific examples of such epoxides are: 1-chloro-2-methyl-3-benzyloxy-1,2-epoxypropane; 1,1 - bis(benzyloxymethyl)ethylene oxide; 1-bromo-2-(benzyloxymethyl)-1,2-epoxybutane; 3-benzyloxy-2-(benzyloxymethyl) - 1,2-epoxybutane; 1-iodo-2-(1-benzyloxypentyl) - 1,2 - epoxyheptane; 1,1 - bis(1 - benzyloxypentyl)-ethylene oxide; 1-chloro-2-(benzyloxymethyl)-1,2-epoxyhexane; 3 - benzyloxy-2-(benzyloxymethyl)-1,2-epoxyhexane; 1 - bromo - 2-(1-benzyloxypropyl)-1,2-epoxypentane; 1,1-bis(1-benzyloxypropyl)ethylene oxide; 1-chloro-3-benzyloxy-2-methyl-1,2-epoxypropane and the like and mixtures thereof.

The novel compounds having Formula I or II are useful as monomers for polymerization reactions because of the olefinic structure which they retain. In addition, the epoxy derivatives thereof are useful in preparing curing agents, adhesives, and as plasticizers in various compositions. Specifically, these novel epoxy derivatives can be used as plasticizers for poly (vinyl chloride).

This invention, for the sake of clearness and understanding, will be illustrated and discussed in connection with its specific application to the production of chlorinated methallyl chloride and to the subsequent benzylation and epoxidation thereof.

EXAMPLE I

Five hundred grams (5.5 mols) of a methallyl chloride were reacted with 520 grams of chlorine (7.3 mols) in the presence of 500 ml. of carbon tetrachloride. The chlorine was passed through a stirrer reactor containing the methallyl chloride and the carbon tetrachloride at room temperature. HCl gas was evolved. The resulting solution was washed four times with water and once with sodium bicarbonate solution to remove HCl, and then dried over calcium chloride. This product was distilled in a 6-inch Vigreux column at atmospheric pressure over a steam bath maintained at 98° C. The residue from this fractionation was distilled in an 18-inch column packed with glass helices at 160 mm. Hg pressure and employing a 5/1 reflux ratio. A mixture of 3-chloro-2-(chloromethyl)propene and 1,3-dichloro-2-methylpropene was obtained in the first fraction. This was used in the reaction described under Example II.

EXAMPLE II

Five hundred milliliters (5 mols) of benzyl alcohol were placed in a stirrer and heated on a steam bath maintained at 98° C. Small pieces of sodium metal were added to the flask gradually until 80 grams (3.5 mols) had been added. At the end of the sodium addition, the mixture had nearly gelled. Five hundred milliliters of tetrahydrofuran was then added as solvent and 230 grams of the mixture of chlorinated methallyl chloride obtained in Example I was added through a dropping funnel. Stirring and heating of the mixture was continued for another two hours. A vigorous reaction took place. The mixture was stirred under reflux for another hour at which time it was substantially gelled. Heating without stirring was continued for another hour. The gel was broken by addition of 1000 ml. of $H_2O$, and two liquid phases consisting of an aqueous phase and an organic phase formed. The aqueous phase was separated from the organic phase and the organic phase was washed twice with water and once with dilute aqueous hydrochloric acid solution. The organic phase was distilled and a mobile oil weighing 564 grams was recovered. Upon vacuum distillation in an 18-inch Vigreux column two products were separated from this oil. The following properties were determined on these two fractions.

Product 1: 1,1 - bis(benzyloxymethyl)ethylene (I), ($C_{18}H_{20}O_2$; M.W. 268.36) 116 g. (0.43 mols). Boiling pt. 163° C. at 0.5 mm. Hg; $n_D^{20}$ —1.5473.

Analysis.—Calculated (percent): C, 8056; H, 7.51. Found (percent): C, 80.2; H, 7.4.

Product 2: 1-chloro-2-methyl-3-benzyloxypropene (II), ($C_{11}H_{13}ClO$; M.W. 196.68) 218 g. (1.1 mols.) Boiling pt. 92° C./1 mm. Hg; $n_D^{20}$ —1.5241.

Analysis.—Calculated (percent): C, 67.18; H, 6.66; Cl, 18.03. Found (percent): C, 67.3; H, 6.7; Cl, 18.1.

The structure of the ethers was confirmed by NMR analysis.

EXAMPLE III

Ninety-four grams (0.35 mol) of 1,1-bis(benzyloxymethyl)ethylene was dissolved in 100 ml. of benzene in a stirred flask. Then 91 grams (0.35 mol) of m-chloroperbenzoic acid was dissolved in 850 ml. of benzene and was slowly added to the stirred flask at room temperature over a 3½ hour period. After 2½ hours a white solid formed. Stirring was continued over night at room temperature. The mixture was filtered and the white solid washed with benzene. The filtrate was washed twice with dilute aqueous sodium carbonate (5 percent), once with water, and dried over anhydrous sodium sulfate. Then the benzene was removed under an aspirator vacuum distillation to leave about 100 grams of an oil. The product was identified as 1,1-bis(benzyloxymethyl)ethylene oxide and had the following analysis:

Product 3: $C_{18}H_{20}O_3$, M.W. 284.36.

Analysis.—Calculated (percent): C, 76.03; H, 7.09; O (oxirane), 5.63. Found (percent): C, 76.0; H, 7.1; O (oxirane), 5.41.

Boiling pt. 156–163°/0.1 mm. Hg; $n_D^{20}$ —1.5450.

A similar run was carried out and this gave 79.5 g. (80 percent yield) of product which boiled at 185–187° C. at 0.8 mm. Hg; $n_D^{20}$ —1.5454.

The structure of the above compounds, both the novel halogenated allylic halide derivatives and also the novel epoxy compounds were proven by nuclear magnetic resonance analysis. The nuclear magnetic resonance data indicated that these samples have the following structures:

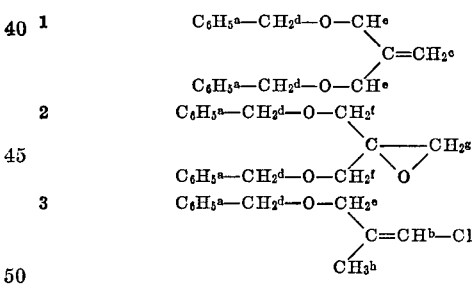

The following assignments were used in formulating these structures:

| | Chemical shift position (tau) |
|---|---|
| $H^a$ aromatic ring protons | 2.63–2.70 |
| $H^b$ chloro-olefinic | Ca. 4.17 |
| $H^c$ terminal olefinic | 4.67 |
| $H^d$ —$CH_2$ alpha to aromatic ring and alpha to —O— | 5.52–5.62 |
| $H^e$ —$CH_2$ alpha to a double bond and alpha to —O— | 5.83–5.97 |
| $H^f$ —$CH_2$ alpha to an epoxy ring and alpha to —O— | 6.37–6.50 |
| $H^g$ —$CH_2$ in an epoxy ring | 7.38 |
| $H^h$ —$CH_3$ alpha to a double bond | 8.33 |

The following integral measurements were made from the spectra:

| Sample | $H^a$ | $H^b$ | $H^c$ | $H^d$ | $H^e$ | $H^f$ | $H^g$ | $H^h$ |
|---|---|---|---|---|---|---|---|---|
| 1 | 10.1 | | 2.2 | 4.0 | 3.8 | | | |
| 2 | 10.1 | | | 4.1 | | 3.9 | 1.9 | |
| 3 | 5.2 | 1.0 | | 2.0 | 2.1 | | | 2.8 |

EXAMPLE IV

Samples having the following formulations were blended and milled at 320° F. and then pressed into sheets of 75 mil thickness at 340° F.

| Constituent | A[1] | B[1] | C[1] |
|---|---|---|---|
| Poly (vinyl chloride) | 100 | 100 | 100 |
| DOP [2] | 51 | 45 | 45 |
| Kronisol-90 [3] | | 6 | |
| 1,1-bis(benzyloxymethyl)ethylene oxide | | | 6 |
| Mark M [4] | 2 | 2 | 2 |
| Stearic acid | 0.5 | 0.5 | 0.5 |

[1] Amounts of constituents are given in parts per 100 parts of polyvinylchloride.
[2] Dioctyl phthalate, a conventional plasticizer for polyvinylchloride.
[3] An epoxy tallate ester marketed by Food Machine Corporation having a molecular weight comparable to 1,1-bis(benzyloxymethyl)ethylene oxide.
[4] An organic Ba-Cd stabilizer of the phenate type containing a chelator marketed by Argus Chemical Company.

The above samples had the following physical properties:

SAMPLE

| | A | B | C |
|---|---|---|---|
| Tensile at break, p.s.i. | 2,733 | 2,653 | 2,770 |
| Elongation at break, percent | 363 | 397 | 397 |
| 100% modulus, p.s.i. | 1,467 | 1,348 | 1,335 |

The foregoing data show that, when 1,1-bis(benzyloxymethyl)ethylene oxide is added to poly (vinyl chloride), physical properties of the resultant poly (vinyl chloride) resin composition are comparable to a composition containing poly (vinyl chloride) and the same amount of a conventional plasticizer, thereby demonstrating that 1,1-bis(benzyloxymethyl)ethylene oxide has utility as a plasticizer for poly (vinyl chloride).

This novel epoxy compound has a molecular weight comparable to commercially available epoxy tallate esters which are well known primary plasticizers for poly (vinyl chloride).

While this invention has been described in a detailed manner and illustrated with particular reference to the chloride derivatives of methallyl chloride, it is to be understood that modifications may be made and that no limitations other than those imposed by the scope of the appended claims is intended.

I claim:
1. Organic compounds selected from the group of compounds characterized by the following formulas:

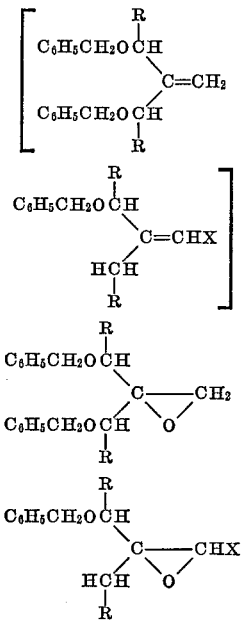

wherein R is selected from the group consisting of hydrogen and alkyl radicals having 1 to 4 carbon atoms and X is selected from the group consisting of chlorine, bromine and iodine.

2. In accordance with claim 1, a compound identified as 1,1-bis(benzyloxymethyl)ethylene oxide.

3. In accordance with claim 1, a compound identified as 1-chloro-2-methyl-3-benzyloxy-1,2-epoxypropane.

References Cited

H. Jahn, Plaste u. Kautschuk, vol. 6, No. 12 (1959), pp. 583–7.

NORMA S. MILESTONE, Primary Examiner

U.S. Cl. X.R.

260—23, 30.4, 348.5, 611, 654

UNITED STATES PATENT OFFICE

CERTIFICATE OF CORRECTION

Patent No. 3,527,773　　　　Raymond L. Cobb　　　　Dated September 8, 1970

It is certified that error appears in the above-identified patent and that said Letters Patent are hereby corrected as shown below:

Column 6, lines 4-15, delete:

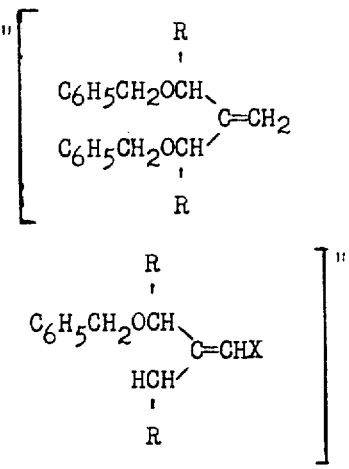

Signed and sealed this 7th day of March 1972.

(SEAL)
Attest:

EDWARD M. FLETCHER, JR.　　　　　　　　ROBERT GOTTSCHALK
Attesting Officer　　　　　　　　　　　　Commissioner of Patents